(12) United States Patent
Hacena et al.

(10) Patent No.: US 8,489,129 B2
(45) Date of Patent: Jul. 16, 2013

(54) TRANSMISSION OF TEXT/MULTIMEDIA MESSAGES OVER BEARER CONNECTIONS

(75) Inventors: Farid Hacena, Aurora, IL (US); Keith Stanley, Warrenville, IL (US)

(73) Assignee: Alcatel Lucent, Paris (FR)

( * ) Notice: Subject to any disclaimer, the term of this patent is extended or adjusted under 35 U.S.C. 154(b) by 1150 days.

(21) Appl. No.: 12/184,745

(22) Filed: Aug. 1, 2008

(65) Prior Publication Data

US 2010/0029307 A1 Feb. 4, 2010

(51) Int. Cl.
*H04W 4/00* (2009.01)
*H04M 1/00* (2006.01)
*H04J 3/24* (2006.01)
*H04L 12/28* (2006.01)
*H04L 1/00* (2006.01)

(52) U.S. Cl.
USPC ........... 455/466; 455/561; 370/349; 370/393; 370/248; 370/249

(58) Field of Classification Search
USPC .................. 455/466, 561; 370/349, 393, 248, 370/249
See application file for complete search history.

(56) References Cited

U.S. PATENT DOCUMENTS

2004/0022208 A1* 2/2004 Dahod et al. .................. 370/328
2008/0112407 A1* 5/2008 Liu ............................... 370/389

* cited by examiner

*Primary Examiner* — Christopher M Brandt
*Assistant Examiner* — Muthuswamy Manoharan
(74) *Attorney, Agent, or Firm* — Duft Bornsen & Fettig LLP

(57) ABSTRACT

Systems and methods are disclosed for transmitting a text/multimedia message over a bearer interface of a mobile network. A first network element of the mobile network, such as an MSC for a Mobile Terminated (MT) text/multimedia message or a BSS for a Mobile Originated (MO) text/multimedia message, receives a text/multimedia message. The first network element communicates with a second network element of the mobile network using a signaling interface (e.g., an IOS A1 interface) to select a bearer connection on a non-voice circuit-mode bearer interface (e.g., an IOS A5 interface), and routes the text/multimedia message to the second network element over the selected connection on the non-voice circuit-mode bearer interface. The first network element may also select a bearer connection on a voice bearer interface (e.g., an IOS A2 interface) and route the text/multimedia message to the second network element over the selected bearer connection.

17 Claims, 4 Drawing Sheets

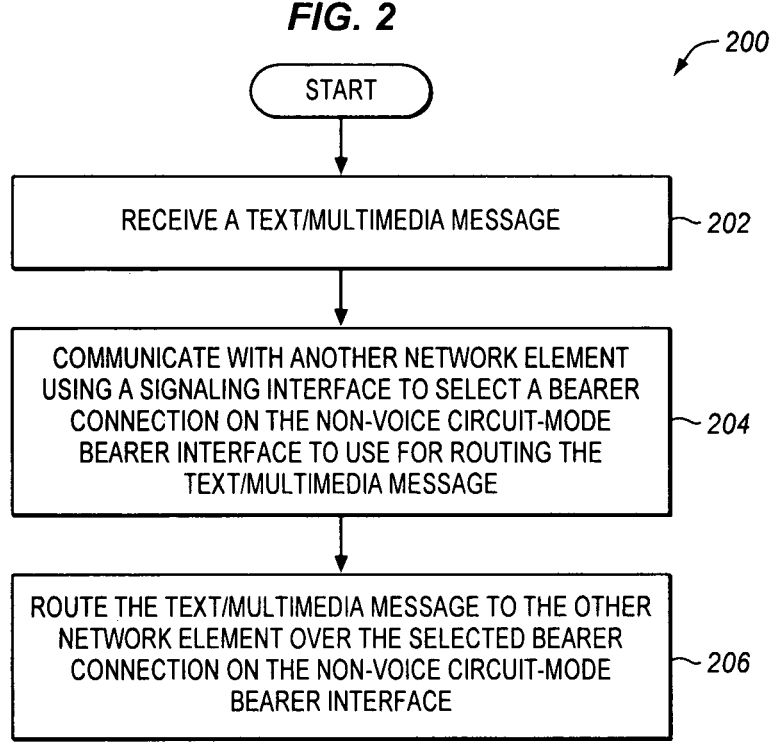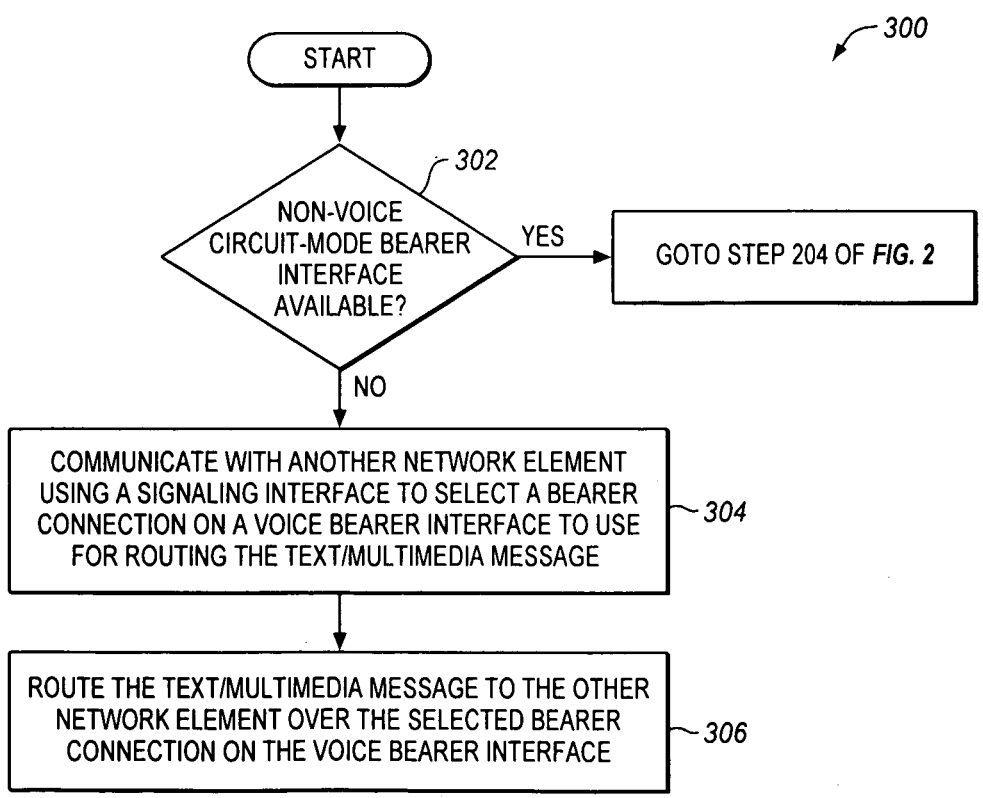

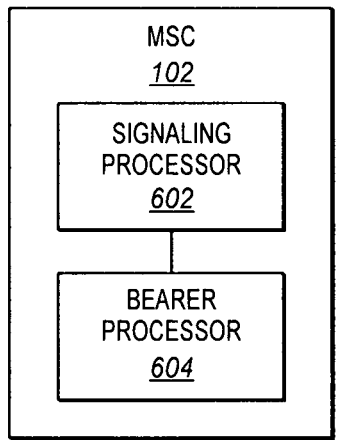
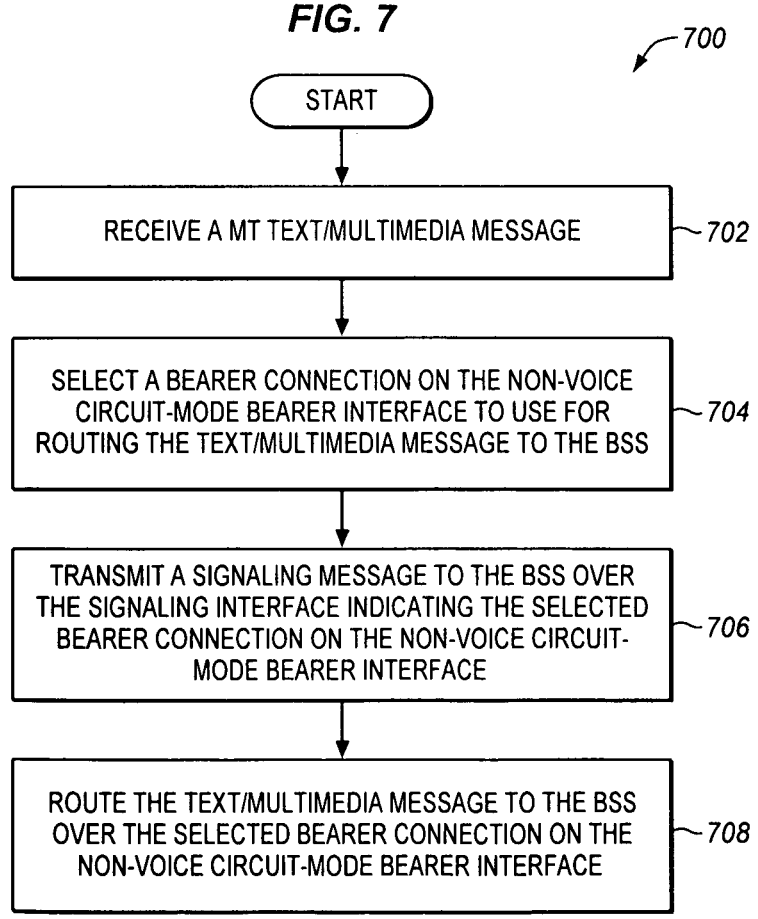

TRANSMISSION OF TEXT/MULTIMEDIA MESSAGES OVER BEARER CONNECTIONS

BACKGROUND OF THE INVENTION

1. Field of the Invention

The invention is related to the field of communication networks and, in particular, to transmitting text and/or multimedia messages over bearer connections that are reserved for non-voice circuit-mode data communications.

2. Statement of the Problem

A typical wireless or mobile network includes a plurality of base stations that communicate via radio frequencies to mobile devices, such as cell phones. Each base station connects to a Base Station System (BSS) which in turn connects to a Mobile Switching Center (MSC) or a similar switching office over a backhaul network. The interfaces between the MSC, the BSS, and the base stations may be based on a proprietary protocol that is defined by the vendor that manufactures the equipment. In other cases, non-proprietary interfaces may be used between the MSC, the BSS, and the base stations so that the equipment does not have to be provided by a single vendor. One example of non-proprietary interfaces is defined in the Interoperability Specification (IOS). The IOS is a standard that describes the overall system functions, including services and features required for interfacing a base station with an MSC (through a BSS), with other base stations, or with a Packet Control Function (PCF). The standard is intended to describe the interfaces used to support the interoperability of one vendor's equipment with another vendor's equipment.

The BSS and the MSC in a mobile network are connected through a signaling interface and one or more bearer interfaces. Signaling connections of the signaling interface are intended to provide a path for signaling traffic, which is used to setup and tear down calls. Bearer connections of the bearer interface are intended to provide paths for user traffic, which represents the actual voice traffic for a voice call, represents the actual data traffic for data calls, etc. As an example of signaling and bearer interfaces, the IOS standards have defined an A1 interface, which is a signaling interface that carries signaling traffic between Call Control (CC) and Mobility Management (MM) functions of the MSC and the call control component of a BSS (i.e., a Base Station Controller (BSC)). The IOS standards have also defined an A2 interface, which is a bearer interface that carries user traffic in the form of 64/56 kbps PCM information (voice/data traffic) between a switch component of the MSC and the BSS (i.e., a channel element or a Selection/Distribution Unit (SDU)). The IOS standards have further defined an A5 interface, which is an interface that carries user traffic for circuit-mode data calls (i.e., fax or modem calls) between the between the MSC and the BSS (i.e., an SDU).

In many mobile networks, text messaging and multimedia messaging has increased in popularity. Short Message Service (SMS) is a communications protocol allowing the interchange of short text messages (i.e., 160 characters) between mobile devices. Multimedia Messaging Service (MMS) is a communications protocol allowing the interchange of multimedia objects (i.e., images, audio, video, rich text) in addition to text. Often times, mobile users more frequently use text messaging and multimedia messaging for communication than voice calls.

Text/multimedia messages are presently transmitted over the signaling interface between the BSS and the MSC. For example, in a Mobile Terminated (MT) SMS message the MSC receives the SMS message from an SMS Center (SMS-C), and routes the SMS message to the BSS using a signaling interface, such as the IOS A1 interface. In a Mobile Originated (MO) SMS message, the BSS receives the SMS message generated in the mobile device, and routes the SMS message to the MSC over a signaling interface, such as the IOS A1 interface.

The increased popularity of text/multimedia messages may cause a problem on the signaling interface with voice calls. In addition to transporting text/multimedia messages, the signaling interface is also used to transport call setup messages for voice calls. A large enough amount of text/multimedia message traffic can cause congestion on the signaling interface, which results in higher call setup delays for the voice calls. Also, during call setup, the MSC sets timers indicating when a signaling message response is expected back from the BSS, and vice-versa. If the signaling interface is congested by a large amount of text/multimedia message traffic, then the signaling message responses may not be received before a time-out, which results in a dropped call. High call setup delays and dropped calls are significant to mobile service providers that are guarantying particular Quality of Service (QoS) levels.

SUMMARY OF THE SOLUTION

Embodiments of the invention provide for the transmission of text/multimedia messages over a bearer interface of the backhaul network instead of over the signaling interface. More particularly, the interfaces between an MSC (or other switching system) and a Base Station System (BSS) include a signaling interface, a bearer interface reserved for voice and/or data communications, and a bearer interface reserved for non-voice circuit-mode data (i.e., fax or modem data), among other interfaces. The embodiments described herein use the bearer interface reserved for non-voice circuit-mode communications, such as the IOS A5 interface, for transmission of text/multimedia messages between the MSC and the BSS. If the bearer connections of the non-voice circuit-mode bearer interface are unavailable or not supported, then the embodiments use the bearer interface reserved for voice and/or data communications, such as the IOS A2 interface, for transmission of text/multimedia messages. In many mobile networks, the non-voice circuit-mode bearer interface is seldom utilized while the signaling interface is becoming more and more congested. The embodiments described herein advantageously offload the text/multimedia message traffic from the signaling interface to an infrequently-used non-voice circuit-mode bearer interface to relieve some of the congestion on the signaling interface.

One embodiment comprises a method of transmitting text/multimedia messages over a bearer interface of a mobile network. The method comprises receiving a text/multimedia message in a first network element of the mobile network, such as an MSC for a Mobile Terminated (MT) text/multimedia message or a BSS for a Mobile Originated (MO) text/multimedia message. The method further comprises communicating with a second network element of the mobile network using a signaling interface to select a bearer connection on a non-voice circuit-mode bearer interface to use for routing the text/multimedia message to the second network element. The second network element may comprise a BSS for a MT text/multimedia message or an MSC for a MO text/multimedia message. The method further comprises routing the text/multimedia message to the second network element over the selected bearer connection on the non-voice circuit-mode bearer interface. In this embodiment, the signaling interface may comprise an IOS A1 interface, and the non-voice circuit-mode bearer interface may comprise an IOS A5 interface.

There may be instances where the non-voice circuit-mode bearer interface is unavailable or not supported for routing a text/multimedia message. In such an instance, the method further comprises communicating with the second network element using the signaling interface to select a bearer connection on a voice bearer interface to use for routing the text/multimedia message to the second network element. The method further comprises routing the text/multimedia message to the second network element over the selected bearer connection on the voice bearer interface. In this embodiment, the voice bearer interface may comprise an IOS A2 interface.

The invention may include other exemplary embodiments described below.

DESCRIPTION OF THE DRAWINGS

The same reference number represents the same element or same type of element on all drawings.

FIG. 2 is a flow chart illustrating a method of transmitting text/multimedia messages over a bearer interface of a mobile network in an exemplary embodiment of the invention.

FIG. 3 is a flow chart illustrating another method of transmitting text/multimedia messages over a bearer interface of a mobile network in an exemplary embodiment of the invention.

FIG. 6 illustrates an MSC in an exemplary embodiment of the invention.

FIG. 7 is a flow chart illustrating a method of transmitting a MT text/multimedia message from an MSC to a BSS over a bearer interface in an exemplary embodiment of the invention.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
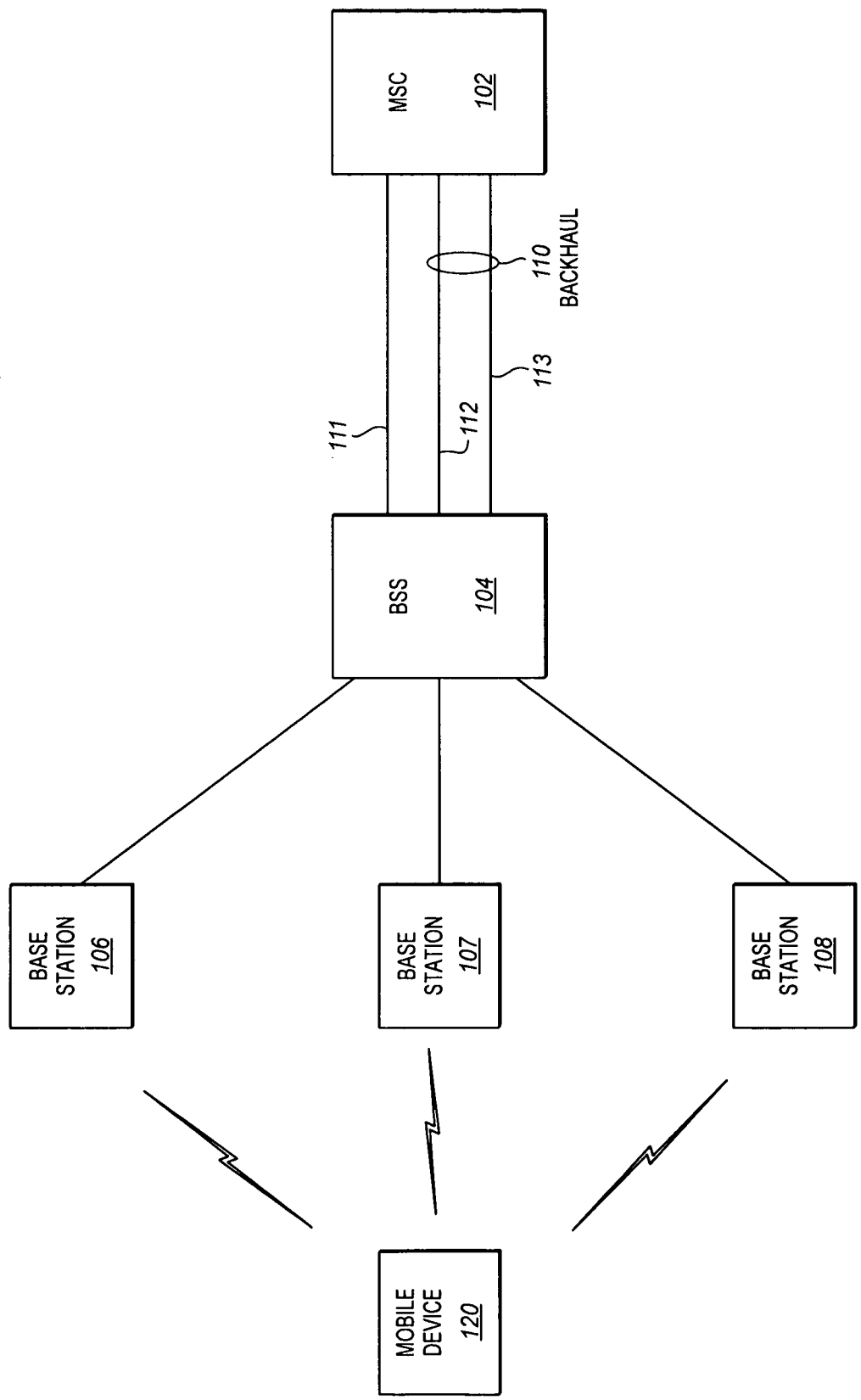
FIG. 1 illustrates a mobile network in an exemplary embodiment of the invention.

FIG. 1 illustrates a mobile network 100 in an exemplary embodiment of the invention. Mobile network 100 comprises any network operable to provide communication service to mobile users, such as a CDMA network, a GSM network, etc. Mobile network 100 includes one or more Mobile Switching Centers (MSC) 102, one or more Base Station Systems (BSS) 104, and a plurality of base stations 106-108. Base stations 106-108 are operable to communicate with a mobile device 120 over the air interface. Mobile device 120 comprises any device operable to communicate with base stations using wireless signals. Mobile device 140 may comprise a cellular phone, a PDA, etc. Mobile device 120 may also be a CDMA device, a WCDMA (3GGSM device), or a device that uses another type of wireless communication technique.

MSC 102 communicates with BSS 104 through a plurality of interfaces. One of the interfaces comprises a signaling interface, which is represented by a signaling connection 111. The signaling interface is operable for exchanging signaling traffic, which is used to setup and tear down calls in mobile network 100. One example of a signaling interface is an IOS A1 interface. Those skilled in the art will appreciate that multiple other standardized or proprietary signaling interfaces may exist.

Another one of the interfaces comprises a non-voice circuit-mode bearer interface, which is represented by bearer connection 112. The non-voice circuit-mode bearer interface is operable for exchanging circuit-mode data or circuit-oriented data instead of voice or packet data. Examples of circuit-mode data include facsimile data and modem data. A non-voice circuit-mode bearer interface uses a dedicated physical path between two end-points in the network for the entire duration of the connection to exchange data communications instead of voice communications. One example of a non-voice circuit-mode bearer interface is an IOS A5 interface that is based on the ISLP (Intersystem Link Protocol) to connect the SDU (in the BSS) to the MSC. Those skilled in the art will appreciate that multiple other standardized or proprietary non-voice circuit-mode bearer interfaces may exist.

Another one of the interfaces comprises a voice bearer interface, which is represented by bearer connection 113. The voice bearer interface is operable for exchanging voice or packet data for calls. For example, the voice bearer interface exchanges the voice communications for a call, exchanges packet data for email, mobile web surfing, etc. One example of a voice bearer interface is an IOS A2 interface. Those skilled in the art will appreciate that multiple other standardized or proprietary voice bearer interfaces may exist.

Connections 112-113 and other connections of the bearer interfaces form a backhaul network 110. Connections 112-113 may be point-to-point communication paths, such as a point-to-point T1/E1. Any of connections 112-113 may also be a switched (or packet switched) communication path, such as over an IP network. The type of connections 112-113 implemented between MSC 102 and BSS 104 may be a matter of design choice, may depend on the vendor for the base station, or may depend on other factors.

Assume that a user of mobile device 120 wants to send a text/multimedia message to another party (a Mobile Originated (MO) scenario), or that another party wants to send a text/multimedia message to the user of mobile device 120 (a Mobile Terminated (MT) scenario). A text/multimedia message may comprise a Short Message Service (SMS) message, a Multimedia Messaging Service (MMS) message, or a message of another protocol. In a MO scenario, mobile device 120 generates the text/multimedia message based on input from the user, and transmits the text/multimedia message over the air interface to one or more of base stations 106-108. The receiving base station(s) forwards the text/multimedia message to BSS 104. BSS 104 would then need to route the text/multimedia message to MSC 102.

In a MT scenario, MSC 102 receives a text/multimedia message from another device that is destined for mobile device 120. MSC 102 would then need to route the text/multimedia message to BSS 104. Traditionally, MSC 102 or BSS 104 would route the text/multimedia message using the signaling interface. According to the embodiments described herein, MSC 102 or BSS 104 uses a bearer interface instead of the signaling interface to route text/multimedia messages.

FIG. 2 is a flow chart illustrating a method 200 of transmitting text/multimedia messages over a bearer interface of a mobile network in an exemplary embodiment of the invention. The steps of method 200 will be described with reference to mobile network 100 in FIG. 1. The steps of the flow chart in FIG. 2 are not all inclusive and may include other steps not shown.

In either a MO or MT scenario, a network element (either BSS 104 or MSC 102) receives a text/multimedia message in step 202. The network element that receives the text/multimedia message communicates with another network element (either MSC 102 or BSS 104) using a signaling interface to select a bearer connection on the non-voice circuit-mode bearer interface (e.g., IOS A5 interface) to use for routing the text/multimedia message to the other network element in step 204. Either one of the network elements may include the functionality, policies, and rules for selecting the bearer connection on the non-voice circuit-mode bearer interface. The network element then routes the text/multimedia message to the other network element using the selected bearer connection on the non-voice circuit-mode bearer interface in step 206. The network element may format the text/multimedia message according to Intersystem Link Protocol (ISLP) or another protocol.

For example, in an MO scenario, BSS 104 receives a text/multimedia message that originated in mobile device 120 (step 202). BSS 104 communicates with MSC 102 using the signaling interface to select a bearer connection on the non-voice circuit-mode bearer interface to use for routing the text/multimedia message (step 204). BSS 104 then routes the text/multimedia message to MSC 102 using the selected bearer connection on the non-voice circuit-mode bearer interface instead of using the signaling interface (step 206). In an MT scenario, MSC 102 receives a text/multimedia message that was originated in another device not shown in FIG. 1 (step 202). MSC 102 communicates with BSS 104 using the signaling interface to select a bearer connection on the non-voice circuit-mode bearer interface to use for routing the text/multimedia message (step 204). MSC 102 then routes the text/multimedia message to BSS 104 using the selected bearer connection on the non-voice circuit-mode bearer interface instead of using the signaling interface (step 206).

Using the non-voice circuit-mode bearer interface instead of using the signaling interface to route text/multimedia messages advantageously relieves congestion on the signaling interface due to text/multimedia messages. In many mobile networks, the non-voice circuit-mode bearer interface is seldom utilized while the signaling interface is becoming more and more congested. By offloading the text/multimedia messages from the signaling interface to the infrequently-used non-voice circuit-mode bearer interface, the signaling interface may be better utilized for setting up voice and data calls.

There may be instances where the non-voice circuit-mode bearer interface is not available for routing text/multimedia messages. For instance, all of the bearer connections of non-voice circuit-mode bearer interface may already be in use making the interface unavailable. Alternatively, the service provider or the vendor for MSC 102 or BSS 104 may not have implemented a non-voice circuit-mode bearer interface. When the non-voice circuit-mode bearer interface is not available, a MSC 102 and BSS 104 may use another bearer interface for routing text/multimedia messages, as described in FIG. 3. The text/multimedia message may be formatted according to 64/56 kbps Pulse Code Modulation (PCM) or another protocol.

FIG. 3 is a flow chart illustrating another method 300 of transmitting text/multimedia messages over a bearer interface of a mobile network in an exemplary embodiment of the invention. The steps of method 300 will be described with reference to mobile network 100 in FIG. 1. The steps of the flow chart in FIG. 3 are not all inclusive and may include other steps not shown.

If the non-voice circuit-mode bearer interface is not available in step 302, then the network element (either BSS 104 or MSC 102) that receives the text/multimedia message communicates with another network element (either MSC 102 or BSS 104) using the signaling interface to select a bearer connection on the voice bearer interface to use for routing the text/multimedia message to the other network element in step 304. The network element then routes the text/multimedia message to the other network element using the selected bearer connection of the voice bearer interface.

For example, in an MO scenario, BSS 104 communicates with MSC 102 using the signaling interface to select a bearer connection on the voice bearer interface (e.g., IOS A2 interface) to use for routing the text/multimedia message (step 304). BSS 104 then routes the text/multimedia message to MSC 102 using the selected bearer connection on the voice bearer interface (step 306). In an MT scenario, MSC 102 communicates with BSS 104 using the signaling interface to select a bearer connection on the voice bearer interface to use for routing the text/multimedia message (step 304). MSC 102 then routes the text/multimedia message to BSS 104 using the selected bearer connection on the voice bearer interface (step 306).

Figure 4:
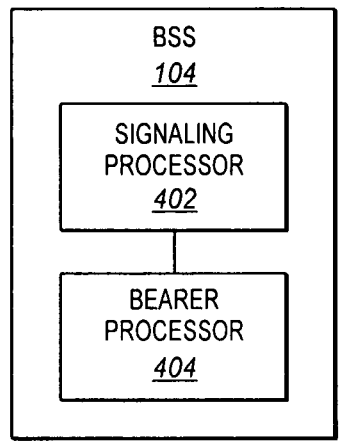
FIG. 4 illustrates a BSS in an exemplary embodiment of the invention.

FIG. 4 illustrates a BSS 104 in an exemplary embodiment of the invention. In this embodiment, BSS 104 includes a signaling processor 402 and a bearer processor 404. A signaling processor 402 comprises any system, server, or function operable to exchange and process signaling messages in mobile network 100. One example of signaling processor 402 comprises a Base Station Controller (BSC). Bearer processor 404 comprises any system, server, or function operable to exchange and process bearer traffic, such as voice calls or data calls, in mobile network 100. Examples of bearer processor 404 include Traffic Processor Unit (TPU), a channel element, and/or a Selection/Distribution Unit (SDU). Those skilled in the art will appreciate that signaling processor 402 and bearer processor 404 may be implemented on the same platform or on different platforms.

Figure 5:
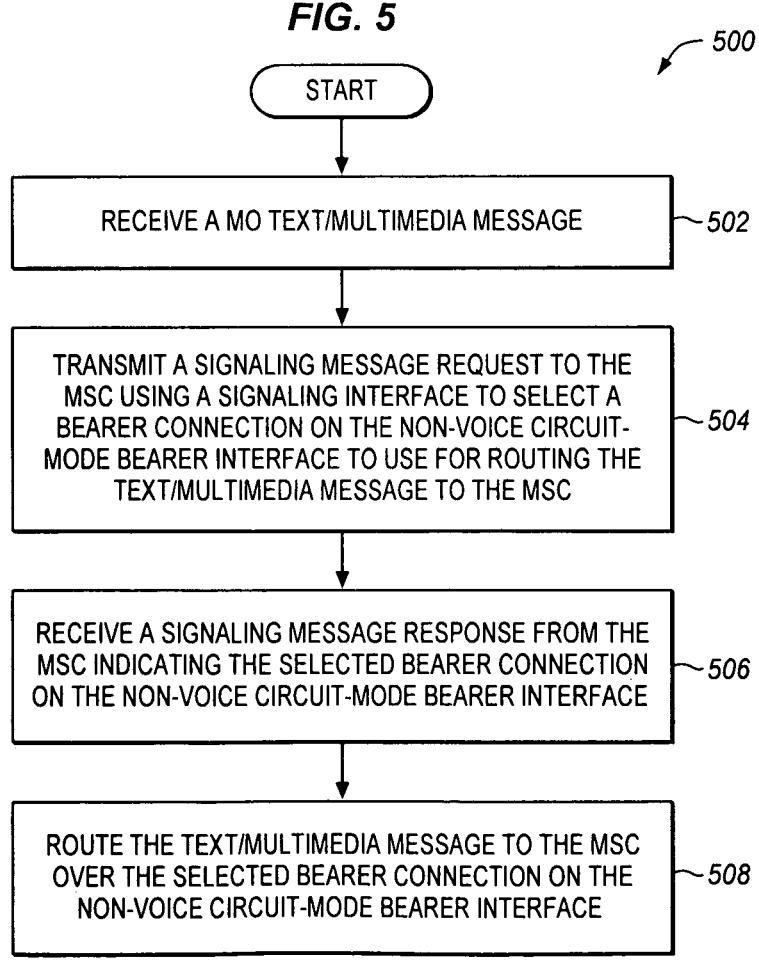
FIG. 5 is a flow chart illustrating a method of transmitting a MO text/multimedia message from a BSS to an MSC over a bearer interface in an exemplary embodiment of the invention.

FIG. 5 is a flow chart illustrating a method 500 of transmitting a MO text/multimedia message from BSS 104 to MSC 102 over a bearer interface in an exemplary embodiment of the invention. The steps of method 500 will be described with reference to mobile network 100 in FIG. 1 and BSS 104 in FIG. 4. The steps of the flow chart in FIG. 5 are not all inclusive and may include other steps not shown.

In step 502, signaling processor 402 receives a text/multimedia message, such as an SMS message or MMS message, from mobile device 120. This is a MO scenario where a user of mobile device 120 has generated the text/multimedia message. In step 504, signaling processor 402 transmits a signaling message request (such as an authentication request, a paging request, etc) to MSC 102 using a signaling interface to select a bearer connection on the non-voice circuit-mode bearer interface to use for routing the text/multimedia message to MSC 102. In step 506, signaling processor 402 receives a signaling message response from MSC 102 over the signaling interface indicating a selected bearer connection on the non-voice circuit-mode bearer interface to use for routing the text/multimedia message. In step 508, bearer processor 404 routes the text/multimedia message to MSC 102 over the selected bearer connection. Bearer processor 404 may format the text/multimedia message according to Intersystem Link Protocol (ISLP) or another protocol. MSC 102 then performs the functions to route the text/multimedia message to the destination.

As an example, responsive to receiving the text/multimedia message, signaling processor 402 may transmit an authentication request to MSC 102 using the signaling interface to authenticate the sender and/or receiver of the text/multimedia message. MSC 102 authenticates the sender and/or receiver of the text/multimedia message, and selects a bearer connection on the non-voice circuit-mode bearer interface for routing the text/multimedia message over the backhaul network 110. MSC 102 then transmits an authentication response to BSS 104 indicating the selected bearer connection on the non-voice circuit-mode bearer interface. MSC 102 may identify the selected bearer connection by a Circuit Identification Code (CIC) or some other identifier. Signaling processor 402 then processes the authentication response to identify the selected bearer connection for the text/multimedia message, and bearer processor 404 routes the text/multimedia message to MSC 102 over the selected bearer connection. Although the bearer connection was selected during an authentication process in this embodiment, BSS 104 and MSC 102 may communicate in a variety of ways over the signaling interface to select a bearer connection for the text/multimedia message.

In an alternative embodiment, BSS 104 may request a particular bearer connection on the non-voice circuit-mode bearer interface to use for the text/multimedia message by identifying a desired bearer connection, and including an indication (e.g., a CIC) of the desired bearer connection in the authentication request or other request to MSC 102. MSC 102 may then use the bearer connection desired by BSS 104, or may select another bearer connection on the non-voice circuit-mode bearer interface based on rules or policies defined in MSC 102. MSC 102 then transmits a response to BSS 104 indicating the selected bearer connection on the non-voice circuit-mode bearer interface, and bearer processor 404 routes the text/multimedia message to MSC 102 over the selected bearer connection.

If a bearer connection on the non-voice circuit-mode bearer interface is not available to use for routing the text/multimedia message, then MSC 102 may select a bearer connection on a voice bearer interface (e.g., IOS A2 interface) for routing the text/multimedia message. Signaling processor 402 in BSS 104 would then receive a signaling message response from MSC 102 over the signaling interface indicating a selected bearer connection on the voice bearer interface to use for routing the text/multimedia message. Bearer processor 404 would then route the text/multimedia message to MSC 102 over the selected bearer connection. Bearer processor 404 may format the text/multimedia message according to 64/56 kbps Pulse Code Modulation (PCM) or another protocol.

FIG. 6 illustrates an MSC 102 in an exemplary embodiment of the invention. In this embodiment, MSC 102 includes a signaling processor 602 and a bearer processor 604. A signaling processor 602 comprises any system, server, or function operable to exchange and process signaling messages in mobile network 100. Bearer processor 604 comprises any system, server, or function operable to exchange and process bearer traffic, such as voice calls or data calls, in mobile network 100.

FIG. 7 is a flow chart illustrating a method 700 of transmitting a MT text/multimedia message from MSC 102 to BSS 104 over a bearer interface in an exemplary embodiment of the invention. The steps of method 700 will be described with reference to mobile network 100 in FIG. 1 and MSC 102 in FIG. 6. The steps of the flow chart in FIG. 7 are not all inclusive and may include other steps not shown.

In step 702, signaling processor 602 receives a text/multimedia message, such as an SMS message or MMS message, intended for mobile device 120. This is a MT scenario where mobile device 120 is the intended recipient of the text/multimedia message which was generated by another user. In step 704, signaling processor 602 selects a bearer connection on the non-voice circuit-mode bearer interface to use for routing the text/multimedia message to BSS 104. In step 706, signaling processor 602 transmits a signaling message to BSS 104 over the signaling interface indicating the selected bearer connection on the non-voice circuit-mode bearer interface to use for routing the text/multimedia message. In step 708, bearer processor 604 routes the text/multimedia message to BSS 104 over the selected bearer connection. Bearer processor 604 may format the text/multimedia message according to Intersystem Link Protocol (ISLP) or another protocol. BSS 104 receives the text/multimedia message over the selected bearer connection, and performs the functions to route the text/multimedia message to mobile device 120.

If a bearer connection on the non-voice circuit-mode bearer interface is not available to use for routing the text/multimedia message, then MSC 102 may select a bearer connection on a voice bearer interface (e.g., IOS A2 interface) for routing the text/multimedia message. Signaling processor 602 in MSC 102 would then transmit a signaling message to BSS 104 over the signaling interface indicating a selected bearer connection on the voice bearer interface to use for routing the text/multimedia message. Bearer processor 604 would then route the text/multimedia message to BSS 104 over the selected bearer connection. Bearer processor 604 may format the text/multimedia message according to 64/56 kbps Pulse Code Modulation (PCM) or another protocol.

In the embodiments of FIG. 5 and FIG. 7, MSC 102 selects the bearer connection on the non-voice circuit-mode bearer interface to use for routing the text/multimedia message. In other embodiments, BSS 104 may select the bearer connection, or another device in mobile network 100 may select the bearer connection that is not shown, such as an application server.

Although specific embodiments were described herein, the scope of the invention is not limited to those specific embodiments. The scope of the invention is defined by the following claims and any equivalents thereof.

We claim:

1. A method of transmitting text/multimedia messages over a bearer interface of a mobile network, the method comprising:
   receiving a text/multimedia message in a first network element of the mobile network;
   communicating with a second network element of the mobile network using a signaling interface to select a bearer connection on a non-voice circuit-mode bearer interface to use for routing the text/multimedia message to the second network element; and
   routing the text/multimedia message to the second network element using the selected bearer connection on the non-voice circuit-mode bearer interface;
   wherein if the non-voice circuit-mode bearer interface is not available or not supported then the method further includes:
      communicating with the second network element using the signaling interface to select a bearer connection on a voice bearer interface to use for routing the text/multimedia message to the second network element; and routing the text/multimedia message to the second network element using the selected bearer connection on the voice bearer interface.

2. The method of claim 1 wherein the non-voice circuit-mode bearer interface comprises an Interoperability Specification (IOS) A5 interface.

3. The method of claim 2 further comprising:
formatting the text/multimedia message according to Intersystem Link Protocol (ISLP).

4. The method of claim 1 wherein the voice bearer interface comprises an Interoperability Specification (IOS) A2 interface.

5. The method of claim 4 further comprising:
formatting the text/multimedia message according to 64/56 kbps Pulse Code Modulation (PCM).

6. The method of claim 1 wherein the signaling interface comprises an Interoperability Specification (IOS) A1 interface.

7. A base station system, comprising:
a signaling processor operable to receive a text/multimedia message, to transmit a signaling message request to an Mobile Switching Center (MSC) using a signaling interface to select a bearer connection on a non-voice circuit-mode bearer interface to use for routing the text/multimedia message to the MSC, and to receive a signaling message response from the MSC over the signaling interface indicating a selected bearer connection on the non-voice circuit-mode bearer interface to use for routing the text/multimedia message; and
a bearer processor operable to route the text/multimedia message to the MSC over the selected bearer connection on the non-voice circuit-mode bearer interface;
wherein if the non-voice circuit-mode bearer interface is not available or not supported, then:
the signaling processor is further operable to receive the signaling message response from the MSC over the signaling interface indicating a selected bearer connection on a voice bearer interface to use for routing the text/multimedia message; and
the bearer processor is further operable to route the text/multimedia message to the MSC over the selected bearer connection on the voice bearer interface.

8. The base station system of claim 7 wherein the non-voice circuit-mode bearer interface comprises an Interoperability Specification (IOS) A5 interface.

9. The base station system of claim 8 wherein the bearer processor is further operable to:
format the text/multimedia message according to Intersystem Link Protocol (ISLP).

10. The base station system of claim 7 wherein the voice bearer interface comprises an Interoperability Specification (IOS) A2 interface.

11. The base station system of claim 10 wherein the bearer processor is further operable to:
format the text/multimedia message according to 64/56 kbps Pulse Code Modulation (PCM).

12. The base station system of claim 7 wherein the signaling interface comprises an Interoperability Specification (IOS) A1 interface.

13. A mobile switching center, comprising:
a signaling processor operable to receive a text/multimedia message, to select a bearer connection on a non-voice circuit-mode bearer interface to use for routing the text/multimedia message to a base station system, and to transmit a signaling message to the base station system over the signaling interface indicating the selected bearer connection on the non-voice circuit-mode bearer interface to use for routing the text/multimedia message; and
a bearer processor operable to route the text/multimedia message to the base station system over the selected bearer connection on the non-voice circuit-mode bearer interface;
wherein if a non-voice circuit-mode bearer interface is not available or not supported, then:
the signaling processor is further operable to select a bearer connection on a voice bearer interface for routing the text/multimedia message, and to transmit a signaling message to the base station system over the signaling interface indicating a selected bearer connection on the voice bearer interface to use for routing the text/multimedia message; and
the bearer processor is further operable to route the text/multimedia message to the base station system over the selected bearer connection on the voice bearer interface.

14. The mobile switching center of claim 13 wherein the non-voice circuit-mode bearer interface comprises an Interoperability Specification (IOS) A5 interface.

15. The mobile switching center of claim 14 wherein the bearer processor is further operable to:
format the text/multimedia message according to Intersystem Link Protocol (ISLP).

16. The mobile switching center of claim 13 wherein the voice bearer interface comprises an Interoperability Specification (IOS) A2 interface.

17. The mobile switching center of claim 13 wherein the signaling interface comprises an Interoperability Specification (IOS) A1 interface.

* * * * *